United States Patent
McMichael et al.

(10) Patent No.: US 6,950,964 B1
(45) Date of Patent: Sep. 27, 2005

(54) DRIVER PROTECTION

(75) Inventors: Lonny Dean McMichael, Duvall, WA (US); George Evangelos Roussos, Seattle, WA (US); Eugene Lin, Seattle, WA (US); Jason Ty Cobb, Sammamish, WA (US); Santosh Sharad Jodh, Sammamish, WA (US); Bjorn Levidow, Bellevue, WA (US); Vadim Bluvshteyn, Redmond, WA (US); Mark Derbecker, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 647 days.

(21) Appl. No.: 10/104,202

(22) Filed: Mar. 22, 2002

(51) Int. Cl.⁷ .............................................. G06F 11/00

(52) U.S. Cl. ..................... 714/38; 714/44; 717/173; 717/178

(58) Field of Search ....... 714/25, 44, 38; 717/168–178

(56) References Cited

U.S. PATENT DOCUMENTS

| | | | | |
|---|---|---|---|---|
| 5,630,076 A | * | 5/1997 | Saulpaugh et al. | 710/104 |
| 5,802,365 A | * | 9/1998 | Kathail et al. | 719/321 |
| 5,870,610 A | * | 2/1999 | Beyda | 717/173 |
| 6,074,434 A | | 6/2000 | Cole et al. | |
| 6,167,494 A | | 12/2000 | Cheston et al. | |
| 6,272,626 B1 | | 8/2001 | Cobbett | |
| 6,550,024 B1 | * | 4/2003 | Pagurek et al. | 714/47 |

* cited by examiner

*Primary Examiner*—Robert Beausoliel
*Assistant Examiner*—Aaron D Matthew
(74) *Attorney, Agent, or Firm*—Amin & Turocy, LLP

(57) ABSTRACT

Systems and methods are provided that prevent faulty drivers from being loaded and/or can prevent faulty drivers from being installed. Thus, instability of a computer system can be mitigated. Additionally, the occurrence of data corruption, system halting and the like can be reduced. A requested driver is compared to a list of faulty drivers from a faulty driver database. If the requested driver is in the list of faulty drivers, the requested driver is deemed faulty or defective, and is prevented from being loaded. Additionally, if the requested driver is in the list of faulty drivers, the requested driver can be prevented from being installed. Otherwise, the requested driver is operable and can be installed and/or loaded.

44 Claims, 11 Drawing Sheets

DRIVER PROTECTION

TECHNICAL FIELD

The present invention relates generally to driver protection, and more particularly to driver protection that protects an operating system and end-users from faulty or incompatible drivers.

BACKGROUND OF THE INVENTION

A driver, or device driver, is a software component that permits a computer system to communicate with the particular device. Because the driver handles device specific features, an operating system is freed from the burden of having to understand and support needs of individual hardware devices. However, if a driver is faulty, the particular device controlled by the driver can fail to work properly and can even be completely inoperative. Such problems are especially problematic for key devices such as a video card, hard drive controller or hard drive. Additionally, a faulty driver can often cause an operating system to become unstable, create problems with a whole computer system and may even lead to system operation halting. If properly identified, faulty drivers can be updated with non-faulty updated drivers to mitigate further problems with the device, operating system and/or computer system. However, faulty drivers can be quite difficult to identify. For example, a faulty driver for a scanner may operate adequately until a printer and video camera are accessed simultaneously. A user or administrator, in such a case, may have a difficult time determining which driver, if any, is faulty.

Computer systems of the past had a relatively small number of peripheral devices (e.g., mouse, keyboard, monitor, video card, printer, floppy drive, drives). In such systems, management of these devices was relatively simple in part due to limited number of manufacturers producing the devices. The manufacturers provided device drivers for the respective devices, and in the event an operating system detected error(s) associated with the device(s) the same manufacturers were able to update, relatively easily and quickly, device drivers to address the error(s). Furthermore, many of the devices of that period were less complex than devices of today and did not require as much work in developing adequate drivers. Also, users and administrators were able to identify problematic drivers because of the limited number of available drivers in the marketplace.

Computer systems of today are different, and often employ a significant number of devices and corresponding device drivers. For example, a typical computer system of today can utilize devices such as sound cards, bus controllers, video capture devices, audio capture devices, universal serial bus devices, firewire controllers and devices, DVD drives, network cards, DSL modems, cable modems, LCD monitors, monitors, laser printers, ink jet printers, fax machines, scanners, digital cameras, digital video cameras and the like. Additionally, a single device can employ more than one device driver. For example, a typical 3-D video card can require numerous device drivers. In addition, device drivers of today are generally more complex than device drivers of the past.

Another problem with drivers is that a device manufacturer may not know that a device driver is faulty. Often, even extensive testing of device drivers fails to identify faulty drivers. It is quite difficult, if not impossible to test a device driver in every conceivable system with every possible other device driver. A user may simply return a device because of a faulty driver without the manufacturer knowing the real reason for the return. Therefore, an updated driver correcting the problems of the faulty driver is not developed. Yet another problem with device drivers is that some manufacturers may not subject their drivers to adequate testing before distribution. Sometimes, manufacturers are in a rush to bring their devices (and device drivers) to market and may forego certain testing procedures in order to satisfy a production/delivery deadline. Another problem associated with device drivers is that there is no adequate means for reporting faulty drivers to manufacturers or operating system developers. Users or administrators are generally required to, at their own initiative, contact a manufacturer or operating system developer to report a faulty driver. Thus, it is likely that many errors caused by faulty drivers are never reported.

Yet another problem with device drivers is that of backwards compatibility. A driver can have a latent defect or bug that is benign and/or undetected on a certain version of an operating system. However, that latent defect can become problematic or even critical for other versions of the operating system due to changes in structures, memory layout and the like.

One approach to mitigating problems caused by faulty drivers is to certify drivers for particular operating systems. A certified driver would then be considered to have passed rigorous testing by a certifying organization; however, this approach is also prone to problems. To adequately test and certify every possible device driver in a timely and efficient manner is not feasible in part because of the vast number of device drivers available. Additionally, even a certified driver can be faulty because, as stated above, it is difficult to test a device driver in every possible system with every other possible device. Finally, there remains no adequate or sufficient means of reporting errors caused by faulty drivers to a manufacturer or operating system developer.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that can prevent faulty drivers from being loaded and/or installed. By mitigating faulty drivers from being loaded and/or installed, computer system stability is facilitated. Additionally, occurrence of data corruption, system halting and the like can be mitigated as well. A system, according to one aspect of the invention, compares a requested driver to a list of faulty drivers from a faulty driver database. Upon a request to load a driver, the requested driver is blocked or prevented from loading if the requested driver is identified in the list of faulty drivers. Upon a request to install a driver, the requested driver can be blocked or prevented from being installed if the requested driver is identified in the list of faulty drivers.

According to another aspect of the invention, a system that prevents faulty drivers from loading is provided. The system comprises a faulty driver database, a driver protection component and an application. The application generates a request to load a requested driver. The faulty driver database maintains a list of faulty drivers. The driver protection component receives the request to load the requested driver and compares the requested driver to the list of faulty drivers to determine whether the requested driver is a faulty driver. The driver protection blocks component blocks loading of the requested driver if the requested driver is among the list.

Yet another aspect of the invention relates to a method of updating a list of faulty drivers. A report regarding a questionable driver is generated—the report includes errors allegedly caused by the questionable driver. The errors allegedly caused by the questionable driver are verified and/or confirmed to determine if the questionable driver is faulty or operable. A vendor associated with the questionable driver is notified of the report on the questionable driver being verified as faulty. The questionable driver is then added to the list of faulty drivers, but typically only if it is verified or confirmed as a faulty driver.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
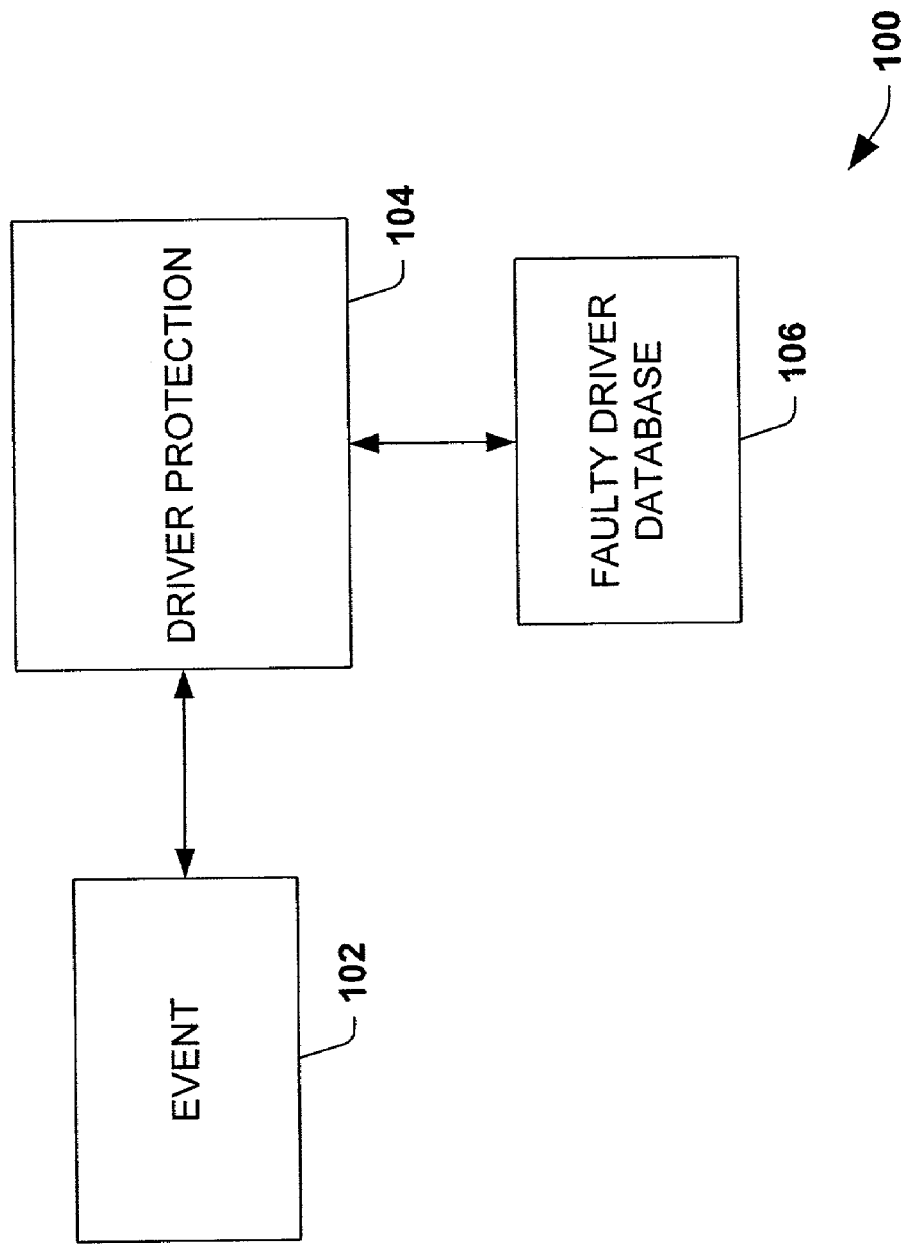
FIG. 1 is a block diagram of a driver protection system according to an aspect of the invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Additionally, the terms "component" and "system" can, at least partially, include user and/or manual interaction.

Operating systems generally provide two operating modes for running software; kernel mode and user mode. The kernel mode is a highly or most trusted mode where software has almost unlimited access to system resources such as I/O and memory addresses and far less exception handling. The user mode is a less trusted mode where software has a controlled access to resources and there is substantially complete exception handling. Device drivers and operating system kernels typically run in kernel mode to improve performance. Applications and other software are usually run in user mode so as to improve overall stability. Thus, an application running in user mode that misbehaves can normally be closed and/or restarted without causing instability of a computer system. However, misbehaving kernel mode software, including device drivers, can easily cause instability of the computer system, cause data corruption, cause data loss, cause blue screens, and the like.

Device drivers are typically loaded during operating system boot. For example, device drivers for hard drives, mice, keyboards, video cards and the like are generally loaded during operating system boot. Additionally, device drivers can be loaded when a device is added to a computer system, such as, for example connecting a printer or scanner after the system has booted up.

FIG. 1 is a block diagram of a driver protection system 100 according to one aspect of the invention—the system 100 prevents identified faulty drivers from loading. The system 100 includes an event 102, a driver protection component 104 and a faulty driver database 106. The event 102 triggers a request to load a device driver, which communicates and/or controls at least a portion of a device associated with the device driver. The associated device can be any suitable device typically used with a computer system such as, sound cards, bus controllers, video capture devices, audio capture devices, universal serial bus devices, firewire controllers and devices, DVD drives, network cards, DSL modems, cable modems, LCD monitors, monitors, laser printers, ink jet printers, fax machines, scanners, digital cameras, digital video cameras and the like. Additionally, the device driver requested to be loaded can be associated with an application such as, for example an antivirus driver for an antivirus application or a port blocking driver for a firewall application. An application, such as an antivirus application, typically operates in user mode therein being unable to load a device driver but can request other components, such as an operating system component, to load a device driver.

The event 102 can be caused or triggered in a number of ways. The event 102 can be triggered during system booting so as to load a desired device driver. Additionally, the event 102 can be triggered by installation or connection of a device to a system. For example, a scanner can be connected to a universal serial bus (in some computer systems) thereby triggering the event 102 to load a device driver associated with the scanner.

The driver protection component 104 is typically a component of the operating system. Generally, the driver protection component 104 at least partially operates in kernel mode. Additionally, the driver protection component 104 can operated, at least partially, in user mode. The driver protection component 104 receives the request to load the device driver, and identifies the requested device driver (e.g., by locating a unique identification or matching information). The term "matching information" includes information such as, but not limited to, filename of a device driver, product version of a device driver, a set of product versions less than or equal to a specified version, a link date of a device driver and a set of link dates less than or equal to a specified date. Once identified, the driver protection component 104 searches the faulty driver database 106 to determine if the requested driver is identified as a faulty driver. The faulty driver database 106 includes a list of faulty drivers and typically includes matching information for the respective drivers in the list. The faulty driver database 106 can include additional information regarding the driver such as where and/or how to obtain an updated driver, severity of the faulty driver and the like. Updated drivers can be provided by vendors, developers, manufacturers and the like. Updated drivers should have modified attributes, such as filename, link date and product version, so as to prevent being misidentified as faulty drivers. At least a portion of the faulty driver database 106 can be located locally, on the local computer system. Additionally, at least a portion of the faulty driver database 106 can be located remotely on a remote system. However, the matching information is typically stored locally.

If the requested driver is not found in the faulty driver database 106, the driver protection component 104 loads or permits the requested driver to be loaded. Additionally, the driver protection component 104 can inform the event 102 that the requested driver has been loaded.

If the driver protection component 104 locates the requested driver in the faulty driver database 106, the requested driver is prevented from being loaded. By so doing, system instability as a result of the requested driver (faulty driver) is mitigated. The driver protection component 104 can then determine a severity code for the requested driver. The severity code is an indication of how severe and/or problematic failure to load the requested driver is. The driver protection component 104 can utilize additional information regarding the driver from the faulty driver database 106 in order to facilitate determining the severity code.

Additionally, the driver protection component 104 determines whether to block an entire stack of drivers or filter certain drivers. Multiple drivers can be associated with a single device. Some of these drivers can be critical for correct functioning of a device whereas others may add non-critical or optional functionality on top of the critical drivers. If one or more of the critical drivers are determined to be faulty, the driver protection component 104 blocks the entire stack of drivers associated with that single device. However, if one of the optional drivers is blocked, the driver protection component 104 can permit loading of other drivers associated with the device.

If the requested driver is not loaded, the driver protection component 104 provides information regarding the failure to load the driver to a user interface (not shown)—the user interface can be viewed by a user. The information can include the name of the requested driver (faulty driver), a reason for failure to load, problems caused by the requested driver, driver update information and the like. In alternate aspects, the information can, instead of or in addition to being provided to the user interface, be written to a log file, electronically delivered to a manufacturer of the requested driver and/or electronically delivered to a software developer, for example.

The faulty driver database 106 is an updateable database, and can be updated periodically, dynamically and/or as requested. The faulty driver database 106 can be updated to include additional faulty drivers and to remove faulty drivers. Updating of the faulty driver database 106 can be achieved by, for example, a user downloading a new listing of faulty drivers. Updating of the faulty driver database 106 can be achieved by any suitable method, such as, by a network connection, optical media, disk drive, hard drive, CDROM drive and the like. Additionally, as another example, the faulty driver database 106 can be updated according to a scheduled system event.

Figure 2:
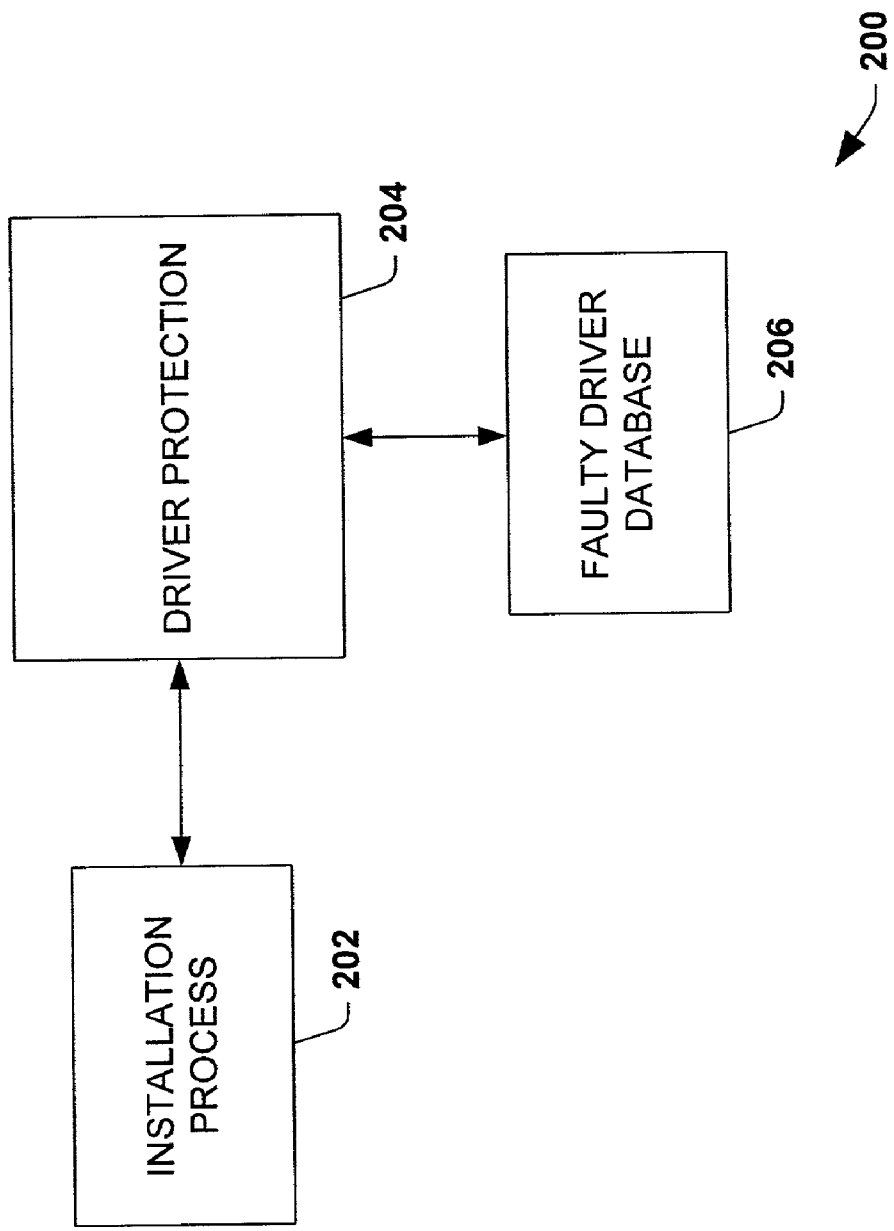
FIG. 2 is a block diagram of a driver protection system for preventing installation of faulty drivers according to an aspect of the invention.

FIG. 2 is a block diagram of a system 200 that can prevent installation of faulty drivers during software installation. The system includes an installation process 202, a driver protection component 204 and a faulty driver database 206. The system 200 can prevent or block known faulty drivers from being installed (i.e., copied) to a system during installation processes such as, device installation and/or application installation.

The installation process 202 is an installation process for a device and/or application, and can be a software component that executes in user mode and is, therefore, unable to load drivers. In an alternate aspect of the invention, the installation process 202 can execute in kernel mode and not load the driver. The installation process 202 installs or copies a number of files including one or more requested device drivers.

The installation process 202 can also include application use information for the one or more requested device drivers. This use information can indicate a level of need of the one or more requested device drivers and the corresponding device(s) by the installation process 202. For example, the use information can indicate that a requested driver is integral to an application, device or software being installed via the installation process 202 and that the installation process 202 should be halted on failure of installing the requested device driver. Conversely, as another example, the user information can indicate that the driver is not required for operation of the installation process 202.

The driver protection component 204 is generally a component of the operating system and can operate in kernel mode and/or user mode. The driver protection component 204 can analyze one or more device drivers during or just after the respective device driver(s) is copied to the system, but before completion of the installation process 202. Then, the driver protection component 204 identifies the device driver(s), generally by locating a unique identification or matching information. Once identified, the driver protection component 204 searches the faulty driver database 206 to determine if the at least one device driver is listed as a faulty driver. The faulty driver database 206 includes a list of faulty drivers and typically includes matching information for the respective drivers in the list. The faulty driver database 206 can include additional information regarding the driver such as where and/or how to obtain an updated driver, severity of the faulty driver and the like. At least a portion of the faulty driver database 206 can be located locally, on the local computer system. Additionally, at least a portion of the faulty driver database 206 can be located remotely on a remote system.

If the driver protection component 204 locates the device driver(s) in the faulty driver database 206, the device driver(s) can be blocked or prevented from being installed. By so doing, system instability as a result of a faulty driver is mitigated. The driver protection component 204 can then determine a severity code for the installation process 202. The severity code is an indication of how severe and/or problematic failure to load the requested driver is to the installation process 202. The driver protection component 204 can utilize the additional information regarding the driver from the faulty driver database 206 in order to facilitate determining the severity code. Then, the driver protection component 204 can provide the severity code to the installation process 202 and inform the installation process 202 that the device driver(s) has not been installed. Additionally, the driver protection component 204 can close or halt the installation process 202 on determining that failure to install the driver(s) would cause an associated device, application and/or software to fail.

If the device driver(s) is identified as faulty and the installation process 202 halted, the driver protection component 204 provides information regarding the faulty driver to a user interface (not shown). The information can include the name of the driver (faulty driver), a reason for failure to load, problems caused by the requested driver, driver update information and the like. In alternate aspects, the information can, instead of or in addition to being provided to the user interface, be written to a log file, electronically delivered to a manufacturer of the requested driver and/or electronically provided to a software developer, manufacturer and/or distributor. Additionally, previously copied files are removed such that the computer system is in a state substantially similar to the state prior to initiation of the installation process 202.

The faulty driver database 206 is an updatable database. The faulty driver database 206 can be updated periodically, dynamically and/or as requested. The faulty driver database 106 can be updated to include additional faulty drivers and to remove faulty drivers. Other update methods can be utilized in accordance with the present invention.

It is appreciated that the system 200 does not necessarily block installation of all faulty drivers, known or unknown. Other installation systems can be used on a computer system, aside from the system 200, that fail to identify and/or block installation of faulty drivers. Additionally, the installation process can, in some aspects, override the blocking of faulty drivers the system 200 thereby permitting installation of faulty drivers.

Figure 3:
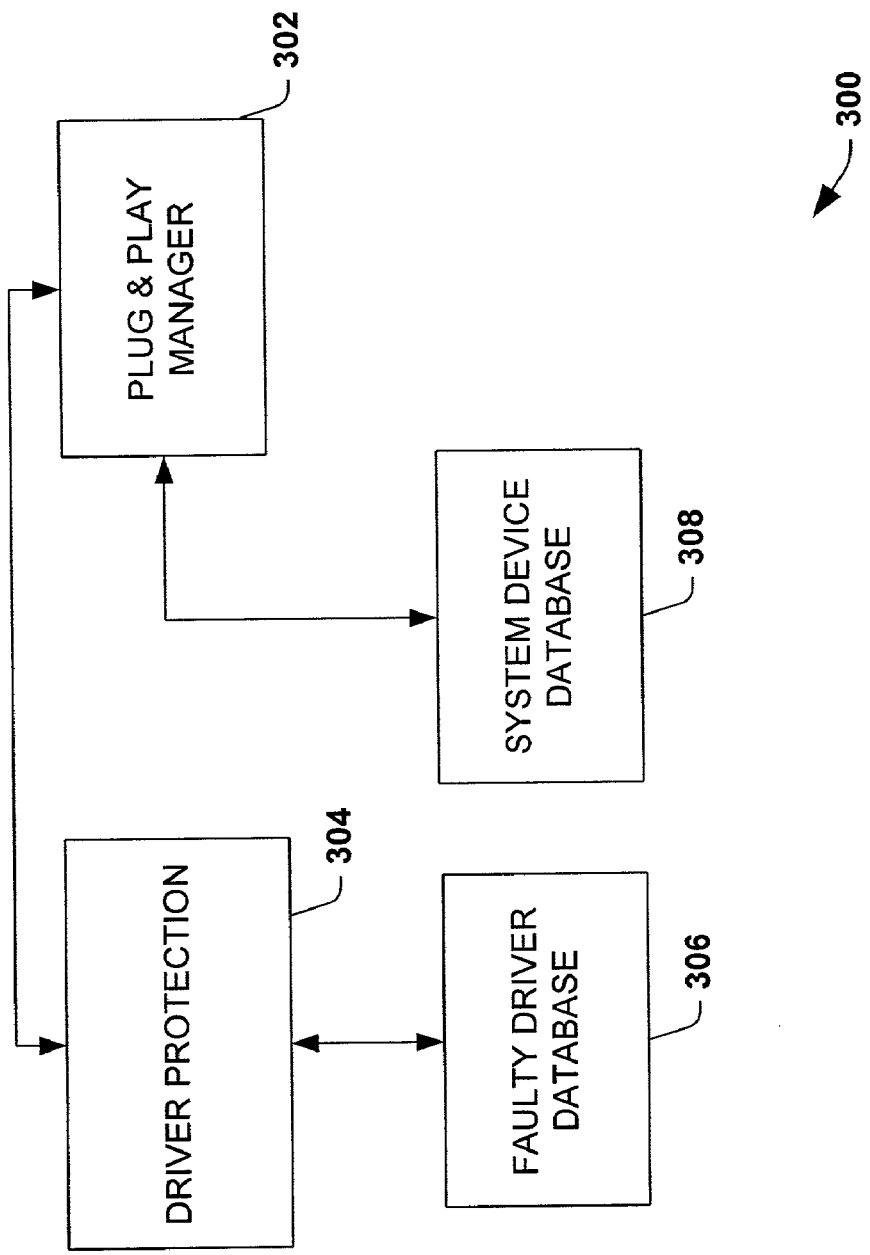
FIG. 3 is a block diagram of a device management system according to an aspect of the invention.

FIG. 3 is a block diagram of a device management system 300 according to one aspect of the present invention. The system 300 allows users and administrators to view devices on their system, to change settings on the devices, to view detailed information on the devices and to view blocked devices. Blocked devices are devices that have one or more associated device drivers blocked because they are identified as faulty drivers. A plug and play manager 302 tracks devices and associated device drivers for a computer system, where the devices and associated device drivers are installed devices and associated installed device drivers. The plug and play manager 302 utilizes a system device database 308 to track the devices and the device drivers. The system device database 308 typically stores one or more device drivers per device. However, some devices are associated with a single device driver. Additionally, associated device information, such as device settings, driver settings, error codes and the like, is also stored with the devices and the device drivers.

A device manager application (not shown) interfaces with the plug and play manager 302 to display a variety of information regarding management of the computer system. The device manager application is operative to display a list of devices installed in the system. Devices that are improperly installed, missing drivers, experiencing hardware conflicts and the like can be highlighted by a graphical mark or icon. The device manager application can display additional properties for the devices automatically or on request. The additional properties can include device settings, driver information, driver settings, hardware conflicts, error codes and the like. A driver protection component 304 blocks faulty drivers from being installed and/or loaded onto the computer system. The driver protection component 304, on a request to load a driver or install a driver, references the driver with a faulty driver database 306. The faulty driver database 306 contains an updateable list of faulty drivers. On identifying or locating a faulty driver, error codes or error information is retrieved from the faulty driver database 306 by the plug and play manager 302. The error information can include the blocked driver and the associated device. Then, the plug and play manager 302 stores the information in the system device database 308. The plug and play manager 302 can then provide information about the blocked driver as requested. The device manager application can display additional information on blocked drivers including, but not limited to reasons for blocking the driver and update information for the driver. The additional information can be provided as, for example, a hyperlink that a user can click on.

Figure 4:
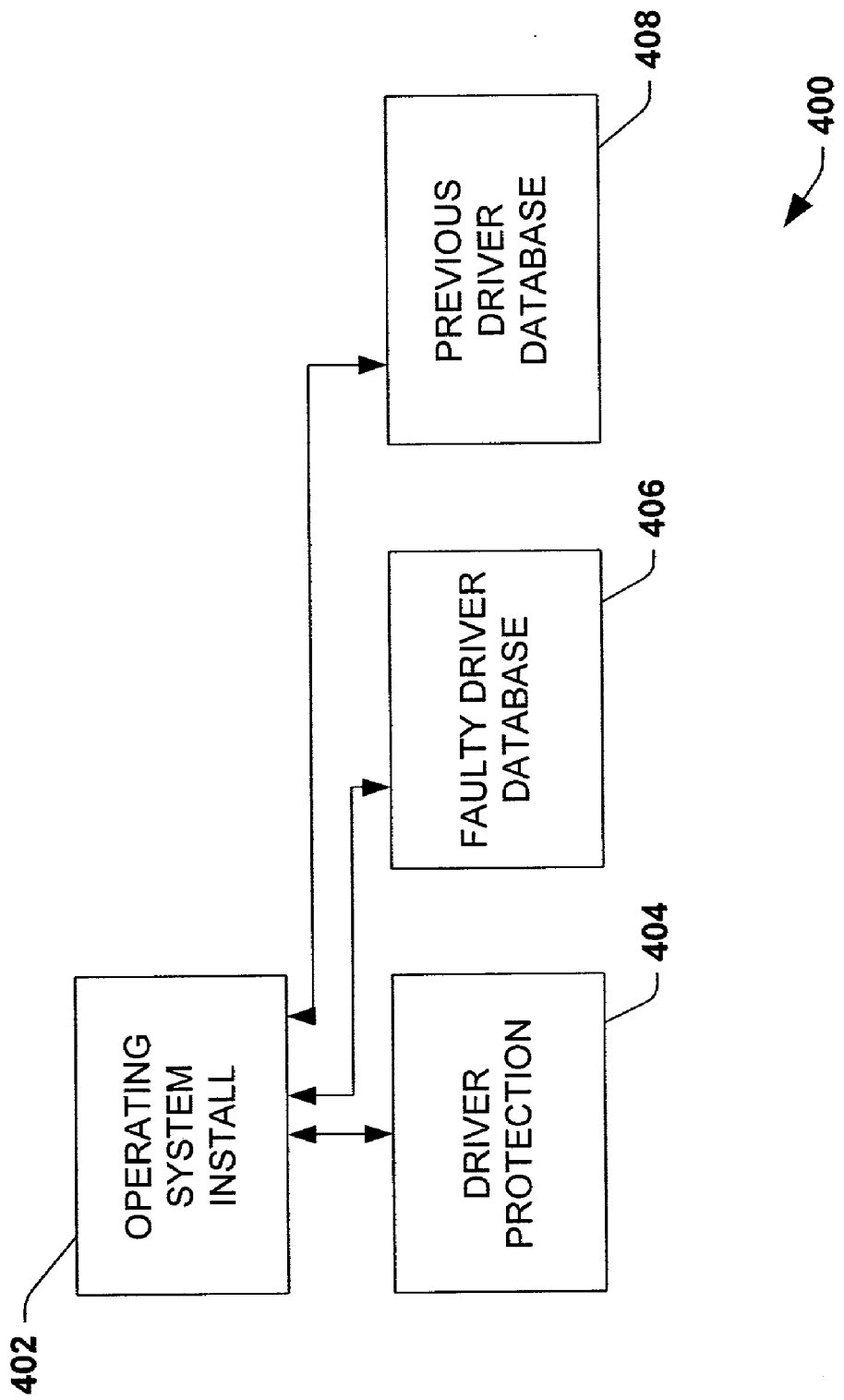
FIG. 4 is a block diagram of a system for that can prevent installation of faulty drivers according to an aspect of the invention.

FIG. 4 is a block diagram of a system 400 for preventing loading of faulty drivers during installation of an operating system according to an aspect of the invention. Installation of an operating system is generally performed under two circumstances, a clean install or an upgrade install. A "clean install" is an installation where a previous operating system is not present or where settings and/or drivers from the previous operating system are not utilized or relied on. A clean install is typically performed on newly constructed computer systems. An "upgrade install" is an installation where a previous operating system is present on the system and where settings and/or drivers from the previous operating system can be utilized. Thus, the system 400 blocks or prevents the loading of faulty drivers during installation of an operating system, whether it is a clean install and/or upgrade install. The system 400 includes an operating system install component 402, a driver protection component 404, a faulty driver database 406 and a previous driver list 408.

The operating system installation component 402 controls and performs installation of an operating system on a computer system. The operating system installation component 402 can perform a number of installation procedures including, but not limited to, selecting optional operating system components, configuring time settings, configuring language settings, setting user preferences, installing devices, installing device drivers associated with the devices and the like. Additionally, the operating system installation component 402 analyzes previous devices and/or drivers to determine if the previous devices and/or drivers can be utilized with the operating system. Similarly, the operating system installation component 402 can determine which previous devices are currently present in the computer system in order to facilitate determining which devices and associated device drivers are to be installed with the operating system (new operating system). The previous device drivers, along with associated information, are generally stored in the previous driver list 408. The associated information includes which devices the drivers correspond to, driver version, device settings, configuration and the like. Additionally, the operating system installation component 402 can remove drivers for removed devices from the previous driver list 408. Then, the operating system installation component 402 determines whether the drivers in the previous driver list 408 are operable or compatible with the operating system being installed. The operating system installation component 402 then removes those drivers that are not operable or compatible with the operating system being installed. Then, the operating system installation component 402 references the faulty driver database 406 to determine if previous device drivers are indicated as faulty or defective. The faulty driver database 406 includes a list of faulty drivers and a unique identification or matching information for the respective drivers in the list. Additionally, the faulty driver database 406 can include additional information regarding the driver such as where and/or how to obtain an updated driver, severity of the faulty driver and the like. At least a portion of the faulty driver database 406 can be located locally, on the local computer system. Also, at least a portion of the faulty driver database 406 can be located remotely on a remote system via a network connection. If drivers from the previous driver list 408 are found within the faulty driver database 406, those found drivers are blocked from being loaded and/or installed with the current operating system. The operating system installation component 402 can display a message regarding blocked drivers using a user interface (not shown). It is appreciated that the previous driver list 408 is not required for clean installations.

The driver protection component 404 adds and/or installs drivers not present or installable from the previous driver list 408. It is appreciated that installed devices generally require device drivers. Thus, the driver protection component 404 provides drivers for installed devices that do not currently have proper device drivers. The add driver protection component 404 is operable to obtain device drivers locally, by local drives and components such as installation disks or CDROMS and/or remotely, by downloading over a network. Prior to installing the drivers from the driver protection component 404, the operating system installation component 402 again references the faulty driver database 406. If drivers from the driver protection component 404 are found in the faulty driver database 406, those respective drivers are blocked from being loaded and/or can be blocked from being installed. Additionally, the operating system installation component 402 can display a message regarding blocked drivers using a user interface (not shown).

Figure 5:
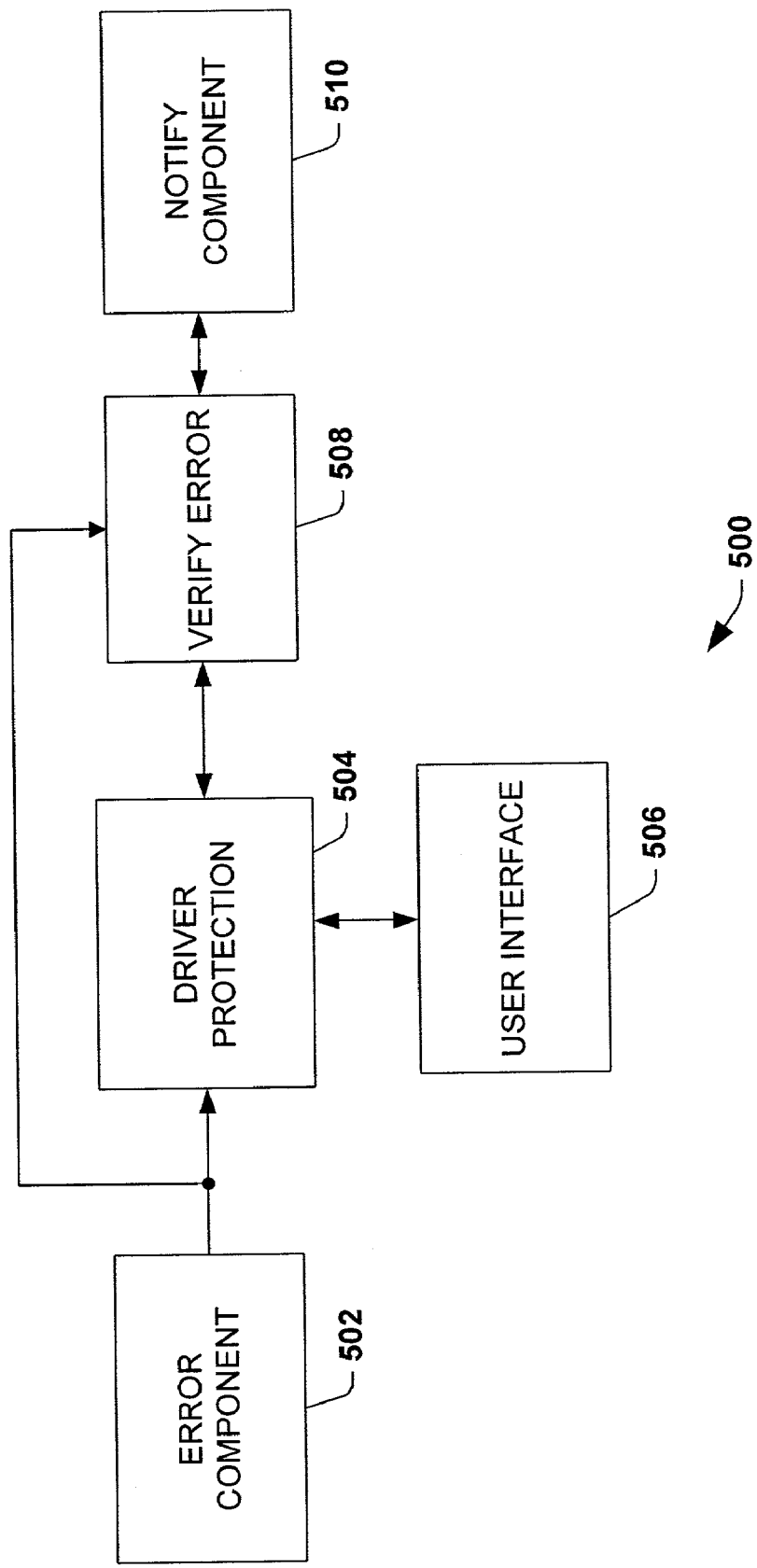
FIG. 5 is a block diagram of a system for identifying faulty drivers according to an aspect of the invention.

FIG. 5 is a system 500 for identifying faulty drivers according to one aspect of the system. The system 500, generally, identifies and reports detected faulty drivers, generally with some user or administrator participation. Additionally, the system 500 can notify a vendor, manufacturer, developer and the like regarding the faulty driver. The system 500 includes an error component 502, a driver protection component 504, a user interface 506, a verify error component 508 and a notify component 510.

The error component 502 initially obtains information about a faulty driver. The error component 502 can obtain the information according to a number of methods. One method of obtaining the faulty driver is through a user input. The user may notice some system instability and believe a particular driver is faulty. Another method is through analyzing crash reports. The crash reports can be analyzed by the error component 502 to determine if one or more drivers are causing system instability and/or other problems. On identifying the faulty driver, the error component 502 notifies the driver protection component 504 and/or a verify error component 508. It is appreciated that one or more faulty drivers can be identified by the error component 502. It is further appreciated that the faulty driver is not necessarily a defective driver and can, at this point, be misidentified as being so.

The driver protection component 504 then blocks the identified faulty driver from being loaded. The driver protection component 504 can compile additional information about the faulty driver to generate a faulty driver report. The additional information can include the current system configuration, operating system, possible conflicting devices and the like. The driver protection component 504 then sends the faulty driver report to the verify error component 508. Additionally, the driver protection component 504 displays a message using a user interface 506 about the faulty driver, the faulty driver report, and devices affected by blocking the faulty driver. The driver protection component 504 is usually located locally on the computer system, but can be located on a remote system.

The verify error component 508 verifies whether the faulty driver is, indeed faulty. Generally, operation of the verify error component 508 employs, at least partially, manual operation by a user and/or operator. The verify error component 508 can use a number of approaches to verify problems with the faulty driver. The verify error component 508 can compare the faulty error report with other, previously received faulty error reports to determine if the faulty driver has previously been verified as faulty. Additionally, the verify error component 508 can attempt to recreate the hardware and software environment reported in order to recreate and, therefore, verify the error. Other suitable approaches can be utilized by the verify error component 508 and still be in accordance with the present invention.

The verify error component 508 is generally located remotely from the local computer system. The verify error component 508 can communicate with the local computer system, specifically the driver protection component 504, via a network. The verify error component 508 can be a component of a system or can be a system in and of itself. The verify error component 508 can, optionally, utilize user or operator interaction.

On verifying the faulty driver, the verify error component 508 sends a verified error report to a notify component 510. On failing to verify the faulty driver error, the verify error component 508 sends an unverified error report to the driver protection component 504. Then, the driver protection component 504 can unblock the faulty driver. The notify component 510 can then notify a number of entities such as, manufacturer, developer and the like regarding the faulty driver. The notify component 510 can provide the verified error report to the number of entities so that the respective entities can modify and/or update the faulty driver to a new, working driver.

Additionally, the faulty driver can be added to a global or master faulty driver database that contains a list of faulty drivers. The global faulty driver database can then facilitate adding the faulty driver to local faulty driver databases. The databases can then be utilized by computer systems to identify faulty drivers and block faulty drivers from being installed and/or loaded.

Figure 6:
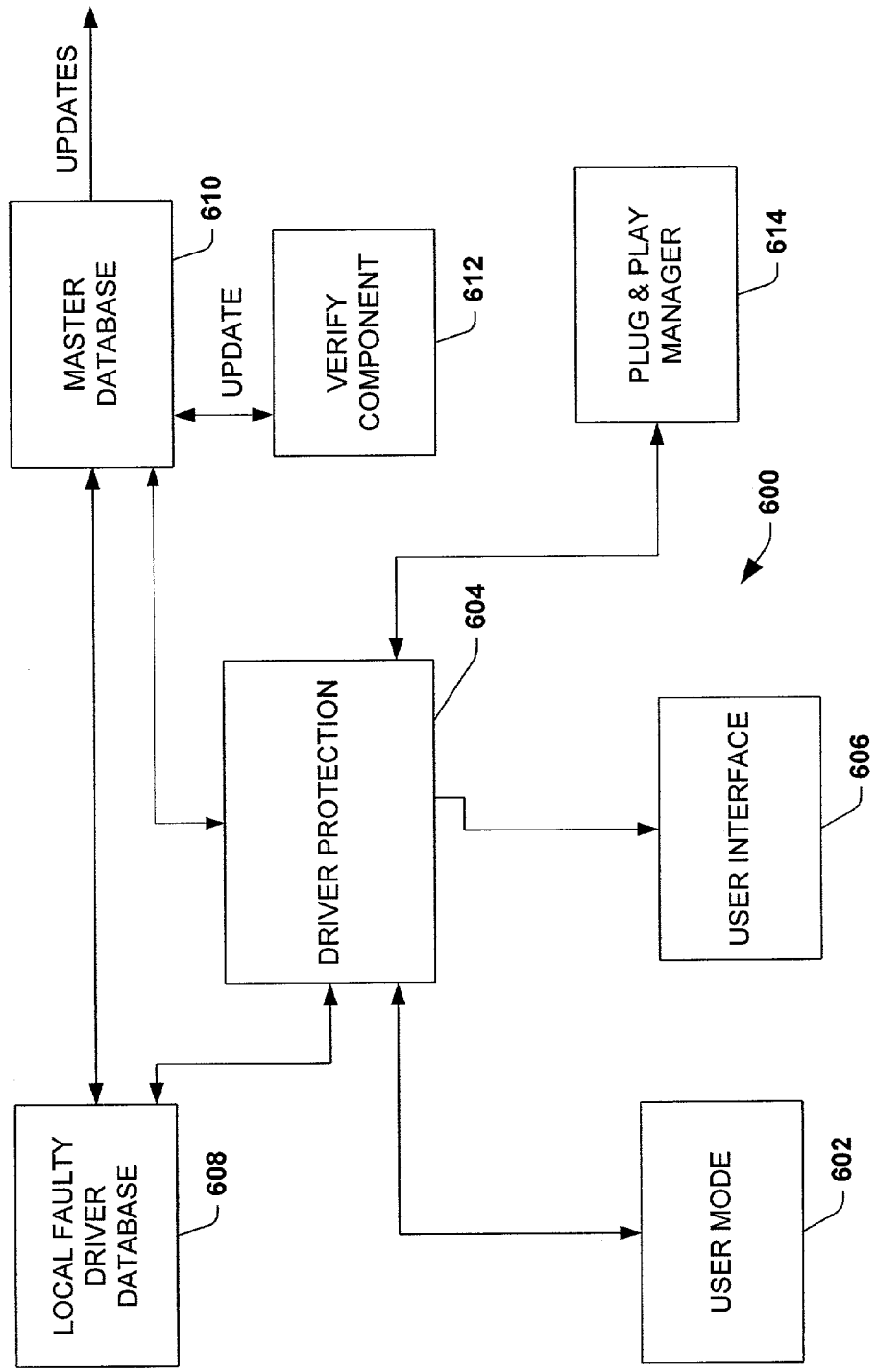
FIG. 6 is a block diagram of a system for handling faulty drivers according to an aspect of the invention.

FIG. 6 is a block diagram of a system 600 for handling faulty drivers according to one aspect of the invention. The system 600 identifies faulty drivers, blocks faulty drivers and maintains an updated list of faulty drivers on a local computer system.

A local database 608 contains a list of known faulty drivers. The faulty drivers are device drivers that have been determined or found to potentially cause system instability. Typically, the local database 608 includes a unique identification or matching information for the respective drivers in the list. The local database 608 can include additional information regarding respective faulty drivers such as where and/or how to obtain an updated driver, severity of the faulty driver and the like. The local database 608 is updateable by a master database 610. Thus, drivers can be added to and/or removed from the local database 608. The master database 610 is not generally located on the local computer system and can be accessible by numerous computer systems. The master database 610, like the local database 608, contains a list of known faulty drivers. The master database 610 generally includes a unique identification or digital identification for the respective drivers in the list. The master database 610 can also be updated.

A user mode component 602 can request to load a device driver. As described above, user mode is a less trusted mode of running software in a computer system. A driver protection component 604 receives the request to load a device driver and references the local database 608 to determine if the requested driver is faulty. The driver protection component 604 generally operates, at least partially, in kernel mode, which is a more trusted mode of running software. As described above, the kernel mode permits substantial access to hardware resources. The driver protection component 604 compare a unique identification of the requested driver with unique identifications of drivers in the local database 608 in order to determine if the requested driver is known to be faulty in order to attempt to locate the requested driver in the local database 608.

On failing to determine that the requested driver is faulty, the driver protection component 604 loads the requested driver and the user mode component 602 continues executing. Additionally another component can monitor operation of the user mode component 602 and the requested driver, as well as other device drivers, to detect system problems such as, instability, corrupted data and the like. On detecting such system problems, the component can send a faulty driver report to a verify component 612. The faulty driver report can include potentially problematic or questionable drivers, system information, installed devices, instability or problems caused, operating system, version information and the like.

On locating the requested driver in the local database 608, the driver protection component 604 blocks loading of the request driver. Additionally, the driver protection component 604 notifies a user or the local computer system of the faulty driver via a user interface 606. The user interface 606 can also display additional information, such as how to obtain an updated driver, effect of blocking the driver and the like. The driver protection component 604 also notifies a user interface component to report the blocked driver.

A device manager application interfaces with a plug and play manager 614 and is operative to display a variety of information regarding management of the computer system. The device manager application is operative to display a list of devices installed in the system. Devices that are improperly installed, missing drivers, experiencing hardware conflicts and the like can be highlighted by a graphical mark or icon. The device manager application can provide additional properties for the devices automatically or on request. The additional properties can include device settings, driver information, driver settings, hardware conflicts, error codes and the like. The plug and play manager 614 can obtain at least a portion of the additional properties from a system device database (not shown). The plug and play manager 614 can disable a device associated with the blocked driver, if the plug and play manager 614 determines that the device can not function properly without the blocked driver being loaded.

As discussed above, the verify component 612 can receive faulty driver reports from the driver protection component 604. The verify component 612 typically is located on a remote system. The verify component 612 is operative to check and/or verify the occurrence of the error that caused the faulty error report to be generated.

The verify component 612 can use a number of approaches to verify problems with the faulty driver. The verify component 612 can compare the faulty error report with other, previously received faulty error reports to determine if the faulty driver has previously been verified as faulty. Additionally, the verify component 612 can attempt to recreate the hardware and software environment reported in order to recreate and, therefore, verify the error. Other suitable approaches to verify the potentially faulty or questionable driver can be utilized by the verify component 612 and still be in accordance with the present invention.

As described above, the verify component 612 is generally located remotely from the local computer system. The verify component 612 can communicate with the local computer system, specifically the driver protection component 604, via a network. The verify component 612 can be a component of a system or can be a system in and of itself. The verify component 612 can, optionally, utilize user or operator interaction. On failing to verify an error with a reported driver, the verify component reports or notifies the driver protection component 604. On verifying problems, the driver and associated information is added to the master database 610. Additionally, a manufacturer and/or software developer can be notified of the faulty driver in order to develop an updated driver.

Figure 7:
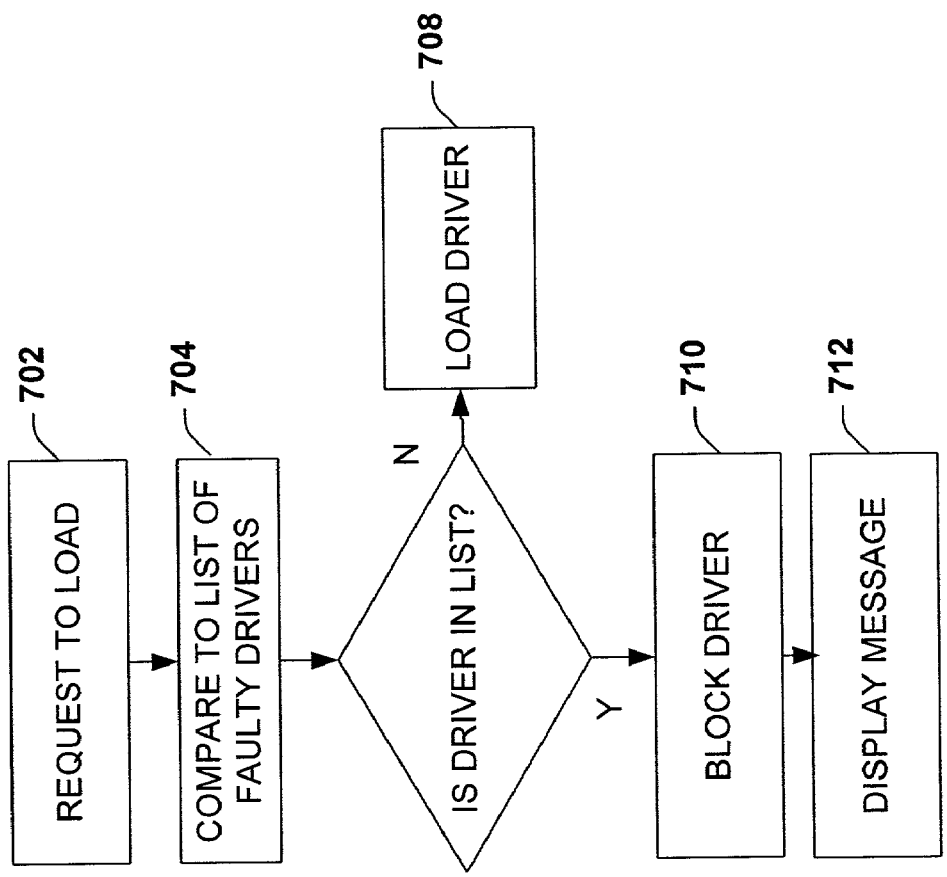
FIG. 7 is a flow chart of a method of blocking a faulty driver according to an aspect of the invention.

FIG. 7 is a flow chart of a method of blocking a faulty driver according to one aspect of the invention. The method prevents known faulty drivers from loading. As stated above, with respect to FIG. 1, computer systems generally provide two operating modes for running software; kernel mode and user mode. The kernel mode is the highly or most trusted mode where software has almost unlimited access to system resources such as I/O and memory addresses and far less exception handling. The user mode is a less trusted mode where software has a controlled access to resources and there is substantially complete exception handling. Device drivers and operating system kernels typically run in kernel mode to improve performance. Applications and other software are usually run in user mode so as to improve overall stability. Thus, an application running in user mode that misbehaves can normally be closed and/or restarted without causing instability of a computer system. However, misbehaving kernel mode software, including device drivers, can easily cause instability of the computer system, cause data corruption, cause data loss, cause crashes, and the like.

A request is made to load a device driver at 702. Generally, the request is triggered by hardware installation, such as by, for example, installing and/or connecting a printer. The device driver communicates and/or controls at least a portion of a device associated with the device driver.

The requested device driver is compared to a list of faulty drivers at 704, generally by employing matching information. The list of faulty drivers can be contained in a faulty driver database. If the requested driver is located in the list of faulty drivers, the requested driver is identified as a faulty driver. If the requested driver is not located in the list of faulty drivers, the requested driver is a non-faulty driver or operable driver. The requested driver is then loaded at 708.

On the requested driver being identified in the list of faulty drivers (i.e., is a faulty driver), the requested driver is blocked or prevented from loading at 710. The blocking of the driver is configurable so as to reduce or minimize the effects of blocking the driver. Multiple drivers can be associated with a single device. Some of these drivers can be critical for correct functioning of a device whereas others may add non-critical or optional functionality on top of the critical drivers. If one or more of the critical drivers are determined to be faulty, the entire stack of drivers associated with that single device can be blocked. However, if one of the optional drivers is blocked, loading other drivers associated with the device can be permitted.

A blocked driver message is displayed at 712. The blocked driver message notifies a user that the requested driver has been blocked and can display information about the requested driver that was blocked, potential problems caused by the blocked driver, update driver information and the like. Additionally, the information can include the name of the requested driver (faulty driver), a reason for failure to load, problems caused by the requested driver, driver update information and the like. In alternate aspects, the information can, instead of or in addition to being provided to the user interface, be written to a log file, electronically delivered to a manufacturer of the requested driver and/or electronically delivered to a software developer. In yet other alternate aspects, an updated driver can be automatically loaded and installed.

The list of faulty driver is an updateable list. The list can be updated periodically, dynamically and/or as requested. The list of faulty drivers can be updated to include additional faulty drivers and to remove faulty drivers. The list of faulty drivers can, for example, be updated by a user downloading a new listing of faulty drivers. Additionally, as another example, the lists of faulty drivers can be updated according to a scheduled system event.

Figure 8:
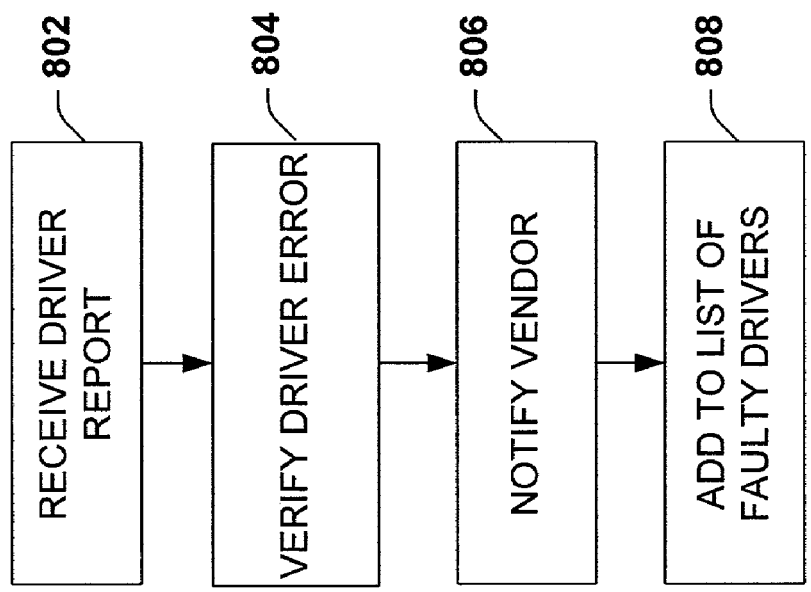
FIG. 8 is a flow chart of a method of updating a faulty driver list according to an aspect of the invention.

FIG. 8 is a flow chart of a method of updating a faulty driver database according to one aspect of the invention. A report is received regarding a questionable driver at 802. The report can be received from a user, a beta user, a developer, a vendor and the like. The report typically includes information regarding the operating environment of the questionable driver, including, but not limited to, operating system, operating system version, processor speed, processor type, installed applications, installed devices, instability and/or problems caused and the like.

The instability and/or problems caused by the questionable driver are verified at 804. Generally, the identified instability and/or problems are reproduced in a substantially similar operating environment. Thus, the questionable driver is tested on a computer system having a similar operating system, operating system version, processor speed, processor type, installed applications, installed devices and the like in order to reproduce the errors. It is appreciated that verification can prevent non-faulty drivers from being identified as faulty drivers. Additionally, this verification can be performed, at least partially, manually by a user or operator.

Device drivers typically have a unique identification or matching information and a vendor or developer that created the respective device drivers. A vendor associated with the questionable driver is notified at 806. The notification can be via a standard template. The notification includes the questionable driver and the driver version and can include operating system, operating system version, processor speed, processor type, installed applications, installed devices, instability and/or problems caused and the like related to the questionable driver. In some instances, the vendor can have the opportunity to refute and/or disprove the problems caused by the questionable driver. Otherwise, it is up to the vendor to create an updated driver that addresses the identified problems.

The questionable driver is added to a list of faulty drivers at 808. The list of faulty drivers is typically a global or master list. Entries in the list typically include a unique identification for respective drivers, associated devices, potential problems caused and the like. Additionally, the list can be updated according to vendors as updates and/or patches are created that fix the questionable (now known as faulty) driver. The vendors can provide updated driver information so that, when the questionable driver is found in a system, the updated information can be provided to a user. The global list of faulty drivers can update local lists of faulty drivers stored on individual, local computer systems.

Figure 9:
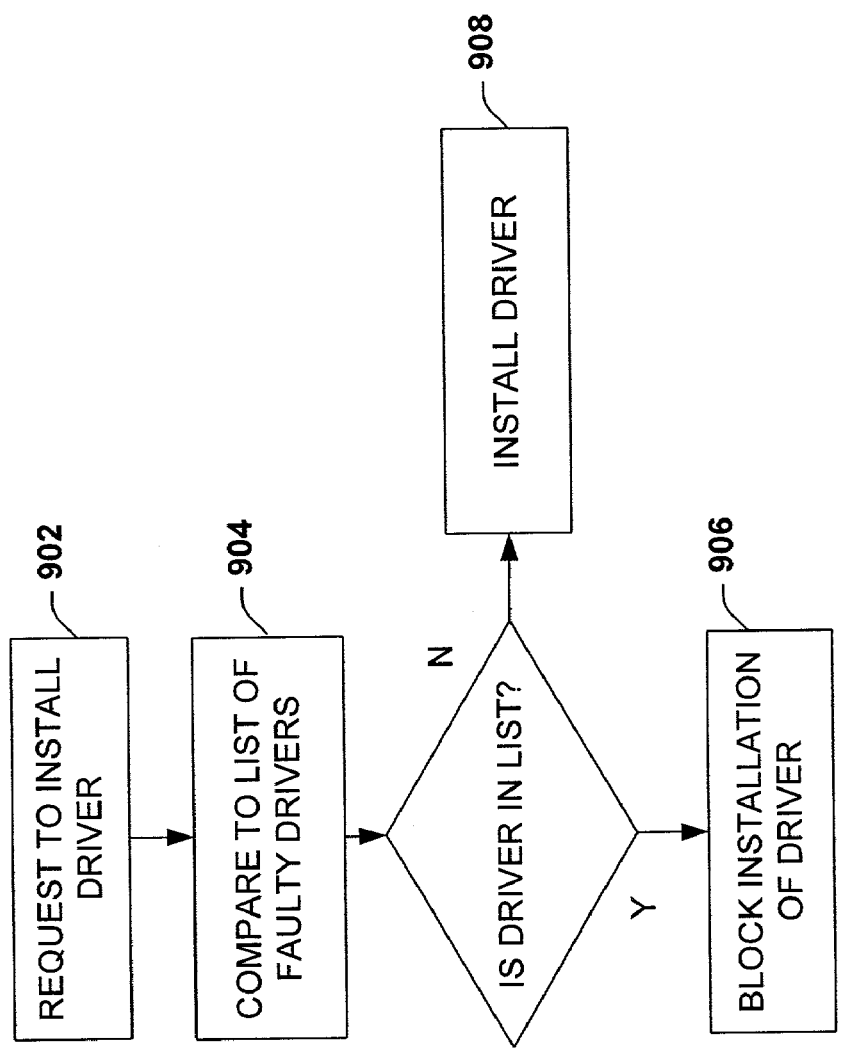
FIG. 9 is a flow chart of a method that can block installation of faulty drivers according to an aspect of the invention.

FIG. 9 is a flow chart of a method that can block installation of faulty drivers according to one aspect of the invention. Generally, drivers are installed for new hardware, new applications, new operating systems and the like. These drivers are typically associated with hardware devices, but can also be associated with software (e.g., antivirus drivers for antivirus software and firewall drivers for firewall software). This method is, for illustrative purposes, described with respect to a single driver, however it is appreciated that any suitable number of drivers can be installed during a typical installation process and that this method can block those that are determined to be faulty.

A request to install a driver is received at 902. Typically, the request to install the driver is received from an installation process. The driver is a device driver and is associated with new hardware, new applications, new operating systems and the like. The requested driver is compared to a list of faulty drivers at 904. The list of faulty drivers can be maintained in a database or other type of storage element. The list of faulty drivers can be updated periodically or as needed via a master list of faulty drivers. Matching information, such as driver identifications, can be employed to perform the comparison. If the requested driver is found or identified in the list of faulty drivers, the requested driver is determined to be faulty and the requested driver is blocked or prevented from loading at 906. Additionally, information regarding the blocked driver can be displayed to inform a user that a driver has been blocked. The information can include update information comprising where to obtain a non-faulty driver to employ instead of the blocked driver. Additionally, the installation process can be suspended or halted depending on a severity of error caused by the blocking of the requested driver. For example, an installation process to install a video card driver can be halted on blocking a faulty driver. Referring once again to the method of FIG. 9, on the requested driver not being identified, the requested driver is installed at 908 and the installation process continues. It is appreciated that the installation process can request to install additional drivers.

Figure 10:
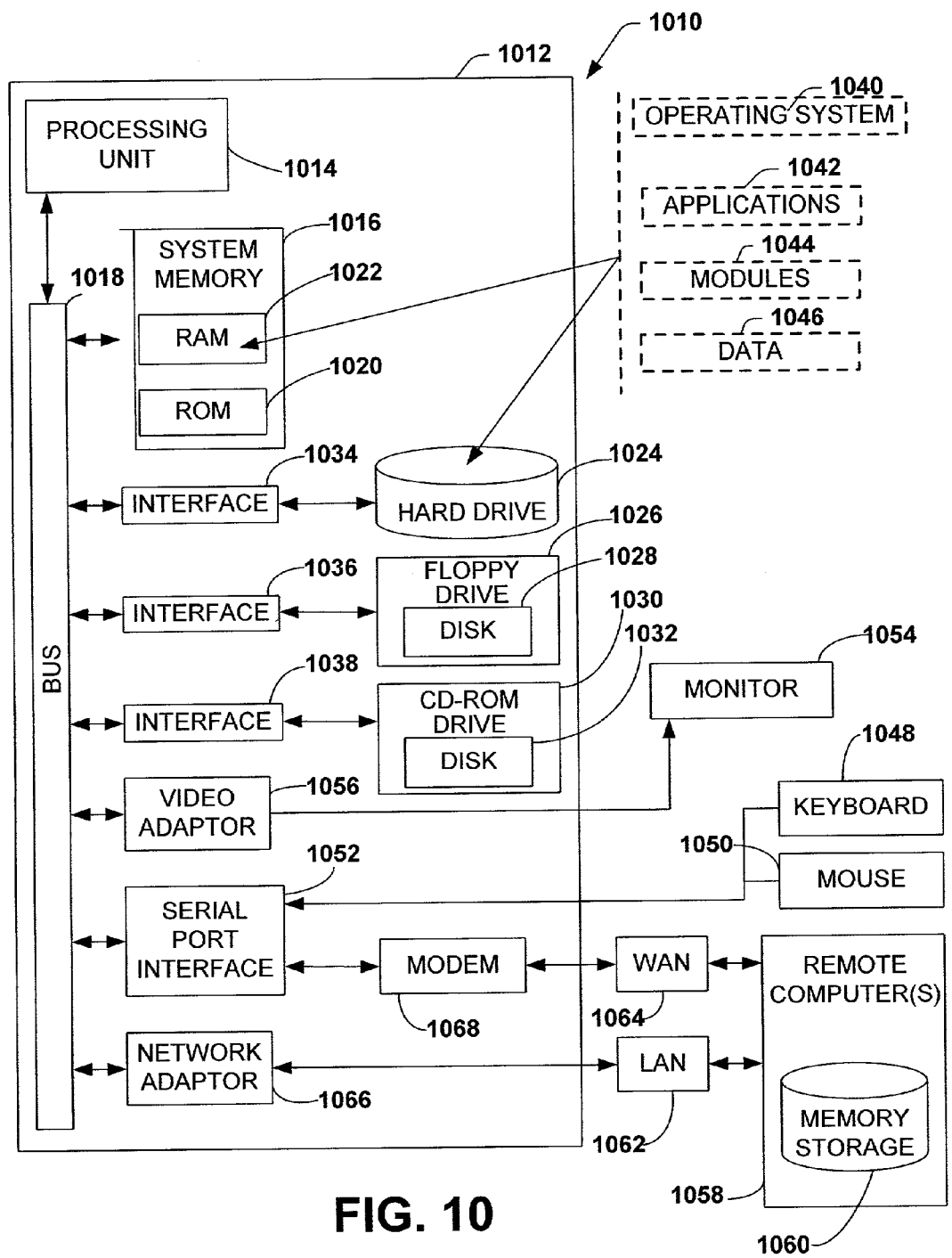
FIG. 10 is a schematic block diagram of an exemplary operating environment for a system configured in accordance with the present invention.

In order to provide additional context for various aspects of the present invention, FIG. 10 and the following discussion are intended to provide a brief, general description of one possible suitable computing environment 1010 in which the various aspects of the present invention may be implemented. It is to be appreciated that the computing environment 1010 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 10 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 10, an exemplary environment 1010 for implementing various aspects of the invention includes a computer 1012, including a processing unit 1014, a system memory 1016, and a system bus 1018 that couples various system components including the system memory to the processing unit 1014. The processing unit 1014 may be any of various commercially available processors. Dual microprocessors and other multi-processor architectures also can be used as the processing unit 1014.

The system bus 1018 may be any of several types of bus structure including a memory bus or memory controller, a peripheral bus, and a local bus using any of a variety of commercially available bus architectures. The computer memory 1016 includes read only memory (ROM) 1020 and random access memory (RAM) 1022. A basic input/output system (BIOS), containing the basic routines that help to transfer information between elements within the computer 1012, such as during start-up, is stored in ROM 1020.

The computer 1012 may further include a hard disk drive 1024, a magnetic disk drive 1026, e.g., to read from or write to a removable disk 1028, and an optical disk drive 1030, e.g., for reading a CD-ROM disk 1032 or to read from or write to other optical media. The hard disk drive 1024, magnetic disk drive 1026, and optical disk drive 1030 are connected to the system bus 1018 by a hard disk drive interface 1034, a magnetic disk drive interface 1036, and an optical drive interface 1038, respectively. The computer 1012 typically includes at least some form of computer readable media. Computer readable media can be any available media that can be accessed by the computer 1012. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other magnetic storage devices, or any other medium which can be used to store the desired information and which can be accessed by the computer 1012. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1022, including an operating system 1040, one or more application programs 1042, other program modules 1044, and program non-interrupt data 1046. The operating system 1040 in the computer 1012 can be any of a number of commercially available operating systems.

A user may enter commands and information into the computer 1012 through a keyboard 1048 and a pointing device, such as a mouse 1050. Other input devices (not shown) may include a microphone, an IR remote control, a joystick, a game pad, a satellite dish, a scanner, or the like. These and other input devices are often connected to the processing unit 1014 through a serial port interface 1052 that is coupled to the system bus 1018, but may be connected by other interfaces, such as a parallel port, a game port, a universal serial bus ("USB"), an IR interface, etc. A monitor 1054, or other type of display device, is also connected to the system bus 1018 via an interface, such as a video adapter 1056. In addition to the monitor, a computer typically includes other peripheral output devices (not shown), such as speakers, printers etc.

The computer 1012 may operate in a networked environment using logical and/or physical connections to one or more remote computers, such as a remote computer(s) 1058. The remote computer(s) 1058 may be a workstation, a server computer, a router, a personal computer, microprocessor based entertainment appliance, a peer device or other common network node, and typically includes many or all of the elements described relative to the computer 1012, although, for purposes of brevity, only a memory storage device 1060 is illustrated. The logical connections depicted include a local area network (LAN) 1062 and a wide area network (WAN) 1064. Such networking environments are commonplace in offices, enterprise-wide computer networks, intranets and the Internet.

When used in a LAN networking environment, the computer 1012 is connected to the local network 1062 through a network interface or adapter 1066. When used in a WAN networking environment, the computer 1012 typically includes a modem 1068, or is connected to a communications server on the LAN, or has other means for establishing communications over the WAN 1064, such as the Internet.

The modem 1068, which may be internal or external, is connected to the system bus 1018 via the serial port interface 1052. In a networked environment, program modules depicted relative to the computer 1012, or portions thereof, may be stored in the remote memory storage device 1060. It will be appreciated that the network connections shown are exemplary and other means of establishing a communications link between the computers may be used.

Figure 11:
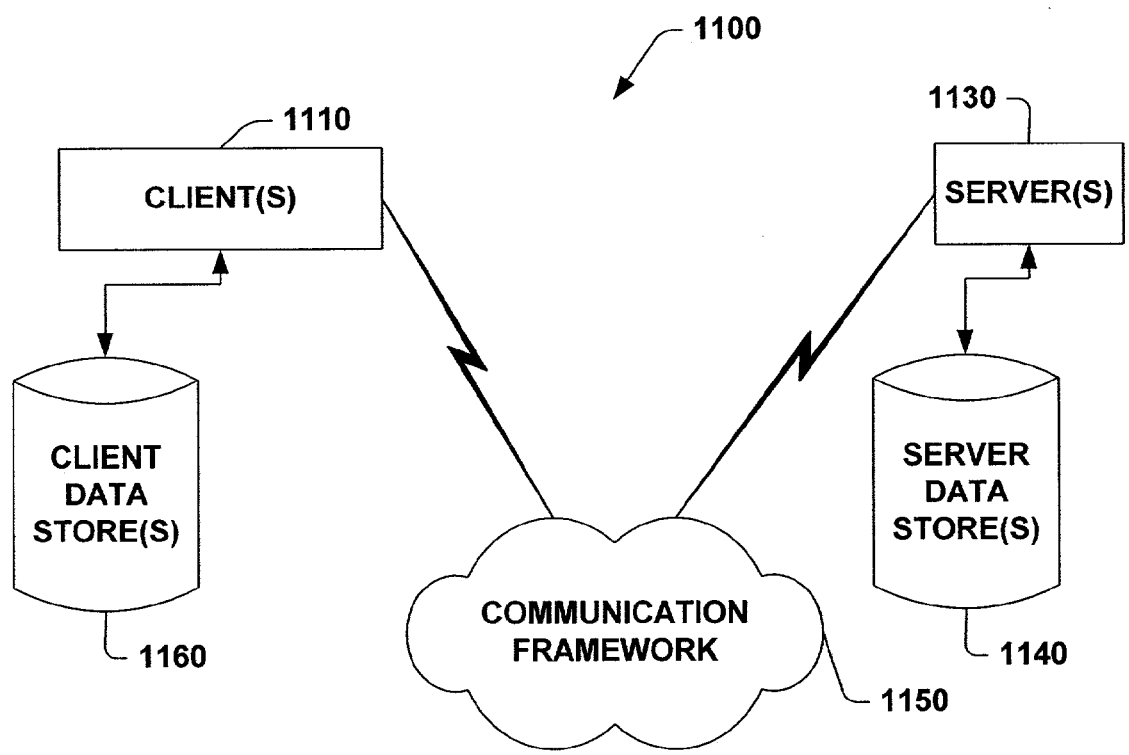
FIG. 11 is a schematic block diagram of an exemplary communication environment in accordance with the present invention.

FIG. 11 is a schematic block diagram of a sample computing environment 1100 with which the present invention can interact. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the present invention, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that prevents faulty drivers from loading, the system comprising:
    a faulty driver database that maintains a list of faulty drivers; and
    a driver protection component that compares a requested driver to the list of faulty drivers from the faulty driver database and that determines whether the requested driver is a faulty driver, and blocks loading of the requested driver on the requested driver being a faulty driver.

2. The system of claim 1, the requested driver having been installed via a recommended operating system installation procedure.

3. The system of claim 1, the requested driver having been installed via a non-recommended operating system installation procedure.

4. The system of claim 1, further comprising an event triggering a request to load the requested driver.

5. The system of claim 4, the event being a presence of an external device.

6. The system of claim 4, the event being triggered via an operating system kernel.

7. The system of claim 4, the event being triggered via an application.

8. The system of claim 1, the driver protection component operating at least partly in kernel mode.

9. The system of claim 1, the driver protection component operating at least partly in user mode.

10. The system of claim 1, the driver protection component displaying information regarding the requested driver being a faulty driver.

11. The system of claim 10, the information comprising the requested driver, identified problems associated with the requested driver and updated driver information.

12. The system of claim 8, further comprising a user interface that displays information regarding the requested driver on the driver being a faulty driver, the information comprising the requested driver, a reason for blocking the requested driver and updated driver information.

13. The system of claim 1, the faulty driver database being a remote database.

14. The system of claim 1, the faulty driver database being a local database and being updateable.

15. The system of claim 14, further comprising a master database that updates the faulty driver database.

16. The system of claim 15, the master database updating other local faulty driver databases.

17. The system of claim 14, the faulty driver database updateable via a network connection.

18. The system of claim 14, the faulty driver database updateable via a CDROM drive.

19. The system of claim 14, the faulty driver database updateable via a disk drive.

20. The system of claim 15, further comprising a verify component that further manually confirms a reported error of the questionable driver.

21. The system of claim 20, wherein the verify component further notifies a vendor regarding the questionable driver.

22. The system of claim 1, further comprising a plug and play manager that maintains a list of system devices and drivers associated with the system devices and that indicates devices having blocked drivers, the blocked drivers obtained via the driver protection component.

23. The system of claim 1, wherein the driver protection component further blocks installation of a driver on comparing the driver with the list of faulty driven and identifying the driver as being faulty.

24. The system of claim 1, wherein the requested driver is associated with a system device.

25. The system of claim 24, the system device being a CDROM drive.

26. The system of claim 24, the system device being a video card.

27. The system of claim 24, the system device being a hard drive controller.

28. A method of blocking a faulty driver comprising:
    comparing a requested driver to a list of faulty drivers to determine whether the requested driver is faulty; and
    on the requested driver being faulty, blocking the requested driver.

29. The method of claim 28, further comprising displaying a message regarding the requested driver being faulty.

30. The method of claim 28, the request to load the requested driver being submitted by an application.

31. The method of claim 28, the request to load the requested driver being submitted by an operating system.

32. The method of claim 28, further comprising updating the list of faulty drivers with additional faulty drivers.

33. The method of claim 28, further comprising updating the list of faulty drivers via a master list.

34. A method of updating a list of faulty drivers comprising:
- generating a report regarding a questionable driver, the report comprising errors caused by the questionable driver;
- verifying the errors caused by the questionable driver;
- notifying a vendor associated with the questionable driver regarding the report and the questionable driver; and
- adding the questionable driver to the list of faulty drivers as a new faulty driver.

35. The method of claim 34 further comprising evaluating a degree of faultiness associated with the questionable driver.

36. The method of claim 34, the errors verified by manually confirming the errors.

37. The method of claim 34, further comprising meeting faulty driver qualification requirements prior to adding the questionable driver to the list of faulty drivers.

38. The method of claim 34, generating the report comprising generating information regarding the questionable driver and errors caused by the questionable driver.

39. The method of claim 34, verifying the errors comprising creating an operating environment substantially similar to a reported operating environment and attempting to recreated the reported errors.

40. The method of claim 34, further comprising obtaining updated driver information related to the questionable driver.

41. The method of claim 34, adding of the questionable driver further comprises inserting the updated driver information in the list of faulty drivers for the new faulty driver.

42. A method of preventing installation of faulty drivers during an installation procedure, the method comprising:
- executing the installation procedure;
- determining a list of drivers to install;
- identifying faulty drivers of the list of drivers to install by employing matching information; and
- blocking installation of the identified faulty drivers by at least preventing copying of the identified faulty drivers.

43. The method of claim 42, the identifying faulty drivers further comprising employing a list of faulty drivers.

44. A computer-readable medium having computer-executable components operable to perform a method of blocking a faulty driver comprising:
- a component for comparing a requested driver to a list of faulty drivers to determine whether the requested driver is faulty;
- a component for loading the requested driver on the requested driver being operable; and
- a component for blocking the requested driver on the requested driver being faulty.

* * * * *

UNITED STATES PATENT AND TRADEMARK OFFICE
CERTIFICATE OF CORRECTION

PATENT NO. : 6,950,964 B1 Page 1 of 1
APPLICATION NO. : 10/104202
DATED : September 27, 2005
INVENTOR(S) : Lonny Dean McMichael et al.

It is certified that error appears in the above-identified patent and that said Letters Patent is hereby corrected as shown below:

In column 6, line(s) 31-38, delete "The installation process 202 is an installation process for a device and/or application, and can be a software component that executes in user mode and is, therefore, unable to load drivers. In an alternate aspect of the invention, the installation process 202 can execute in kernel mode and not load the driver. The installation process 202 installs or copies a number of files including one or more requested device drivers." and insert -- The installation process 202 is an installation process for a device and/or application, and can be a software component that executes in user mode and is, therefore, unable to load drivers. In an alternate aspect of the invention, the installation process 202 can execute in kernel mode and not load the driver. The installation process 202 installs or copies a number of files including one or more requested device drivers. --, therefor, on line 30 as the continuation of the paragraph.

In column 18, line 45, in Claim 23, delete "driven" and insert -- drivers --, therefor.

Signed and Sealed this

Twenty-eighth Day of July, 2009

JOHN DOLL
*Acting Director of the United States Patent and Trademark Office*